United States Patent
Zhou et al.

(10) Patent No.: US 9,903,703 B2
(45) Date of Patent: Feb. 27, 2018

(54) DEVICE AND METHOD FOR DETECTING ABSOLUTE MULTI-TURN ROTATION ANGLE

(71) Applicants: WANXIANG QIANCHAO(SHANGHAI) AUTOMOTIVE SYSTEMS CO., LTD., Shanghai (CN); WANXIANG GROUP, Hangzhou, Zhejiang Province (CN)

(72) Inventors: Liangjie Zhou, Shanghai (CN); Xiao Tao, Shanghai (CN); Zhiyuan Ren, Shanghai (CN); Suoping Wu, Shanghai (CN); Jing Mao, Shanghai (CN); Jian Chen, Shanghai (CN); Xudong Cai, Shanghai (CN); Jiangping Tang, Shanghai (CN)

(73) Assignees: WANXIANG QIANCHAO(SHANGHAI) AUTOMOTIVE SYSTEMS CO., LTD., Shanghai (CN); WANXIANG GROUP, Hangzhou (CN)

( * ) Notice: Subject to any disclaimer, the term of this patent is extended or adjusted under 35 U.S.C. 154(b) by 858 days.

(21) Appl. No.: 14/125,933

(22) PCT Filed: Nov. 11, 2012

(86) PCT No.: PCT/CN2012/084431
§ 371 (c)(1),
(2) Date: Dec. 12, 2013

(87) PCT Pub. No.: WO2014/008728
PCT Pub. Date: Jan. 16, 2014

(65) Prior Publication Data
US 2014/0278223 A1  Sep. 18, 2014

(30) Foreign Application Priority Data

Jul. 10, 2012  (CN) .......................... 2012 1 0238062

(51) Int. Cl.
*G01C 9/00*    (2006.01)
*G01C 17/00*   (2006.01)
(Continued)

(52) U.S. Cl.
CPC ................. *G01B 7/30* (2013.01); *G01D 5/04* (2013.01); *G01D 5/145* (2013.01)

(58) Field of Classification Search
CPC ............. G01D 5/04; G01D 5/145; G01B 7/30
(Continued)

(56) References Cited

U.S. PATENT DOCUMENTS 5,930,905 A * 8/1999 Zabler ....................... G01D 5/04
33/1 PT
7,583,080 B2 * 9/2009 Uehira ............... B62D 15/0215
324/207.12
(Continued)

FOREIGN PATENT DOCUMENTS

JP           05026760 A  *  2/1993   ............... H01B 3/12

*Primary Examiner* — David M Gray
*Assistant Examiner* — Geoffrey T Evans
(74) *Attorney, Agent, or Firm* — Jiwen Chen

(57) ABSTRACT

A device and method for detecting an absolute multi-turn rotation angle. The device includes a housing, a cover plate and a rotating shaft. The rotating shaft is fixed with a main gear, which is meshed with driven gears including a large driven gear and a small driven gear. The main gear is externally meshed with the large driven gear. The driven gears are connected with a two-stage speed reduction device which enables the rotating shaft to rotate multiple circles to slow down to a circle-number gear and enables the circle-number gear to rotate one circle only. Both driven gears and the circle-number gear are provided with bearings. The
(Continued)

bearings have magnets therein, and the two magnets are relatively fixed with the driven gears and the circle-number gear, respectively. The top edges of the bearings fit with a printed circuit board, angle sensing chips which are fixed on the printed circuit.

10 Claims, 5 Drawing Sheets

(51) Int. Cl.
G01C 19/00 (2013.01)
G01B 7/30 (2006.01)
G01D 5/14 (2006.01)
G01D 5/04 (2006.01)

(58) Field of Classification Search
USPC .......................................................... 702/151
See application file for complete search history.

(56) References Cited

U.S. PATENT DOCUMENTS

| 2003/0218458 | A1* | 11/2003 | Seger ..................... G01D 5/142 |
| | | | 324/303 |
| 2004/0145364 | A1* | 7/2004 | Onishi ..................... G01D 5/04 |
| | | | 324/207.2 |
| 2009/0188743 | A1* | 7/2009 | Ruetz ................. B62D 15/0215 |
| | | | 180/446 |
| 2009/0234540 | A1* | 9/2009 | Collet .................. B62D 15/021 |
| | | | 701/42 |
| 2013/0312512 | A1* | 11/2013 | Fels ....................... G01B 5/202 |
| | | | 73/162 |

\* cited by examiner

DEVICE AND METHOD FOR DETECTING ABSOLUTE MULTI-TURN ROTATION ANGLE

This is a U.S. national stage application of PCT Application No. PCT/CN2012/084431 under 35 U.S.C. 371, filed Nov. 11, 2012 in Chinese, claiming the priority benefit of Chinese Application No. 201210238062.7, filed Jul. 10, 2012 in Chinese, which is hereby incorporated by reference.

TECHNICAL FIELD

The invention relates to the technical field of rotation angle detection, and in particular, to a device and method for detecting an absolute multi-turn rotation angle.

BACKGROUND OF THE INVENTION

Currently, the device for detecting a rotation angle is applied to various industries, especially for detecting a motor rotation angle, industrial knob position, and vehicle steering wheel rotation angle in the automobile industry. However, the existing technical solutions still have the following defects. In one case, a process for detecting a rotation angle of an object capable of rotating more than 360 degrees was disclosed as in Patent No. CN1090315C. This solution is realized by a relative relation between two driven gears externally meshed with the main gear respectively and their respective rotation angles. Errors of the two driven gears are introduced to the calculation during the calculating process, so the fluctuation of precision, resolution, zero drift and nonlinearity of the rotation angle may be serious when analyzed from the performance perspective. Since the algorithms are complex, the system stability depends not only on the sensor but also on the stability of other units such as digital-to-analog converters, and accumulator inside micro control unit. In addition, certain requirements on the application environment are proposed for end users. Thus, the probability of occurrence of errors is relative high. In a second case, two pulse signals are output by using the principle of optoelectronics or the Hall principle, and the rotation angle is obtained from the pulse phase relation. For such a device and a detection process, the zero position cannot be marked and recorded from the output signals, and the user needs to identify the zero position again each time when the device is powered on. In addition, the resolution of the detection device depends on the rotation angle corresponding to a single pulse period, the numbers of the pulses should be distributed equally within 360 degrees, and the number of the hole or tooth corresponding to each pulse is limited within 360 degrees. Due to the facts that the space for installation is small and the size is limited, the highest resolution of the detection device may only reach up to 0.5 degrees. When the rotation angle is smaller than the resolution, no effective angle is output. Further, the rotation direction is determined by the sequence of the two pulses, so the rotation direction cannot be identified. Such angle detection device is likely to miss signal pulse. Consequently, no valid rotation angle is output.

SUMMARY OF THE INVENTION

The purpose of the present invention is to provide a device and method for detecting an absolute multi-turn rotation angle, which effectively improves a resolution of multi-turn angle detection, and the output signal is directly an absolute angle, and which is simple in the algorithm for angle calculation and improves the reliability and stability of the output angle.

In order to solve the above problems, the invention relates to a device for detecting an absolute multi-turn rotation angle, comprising a housing, a cover plate, and a rotating shaft. The rotating shaft is placed to go through the housing. The rotating shaft is fixed with a main gear, and no relative rotation or axial movement exists between the main gear and the rotating shaft. The driven gears comprise a large driven gear and a small driven gear, the main gear is externally meshed with the large driven gear, the teeth number of the large driven gear is smaller than that of the main gear. Thus, the angle of the large driven gear is magnified to improve the resolution of the detection device and reduce the size of the whole detection device. The driven gears are provided with a two-stage speed reduction device which enables the rotating shaft to rotate multiple circles to slow down to the circle-number gear and enables the circle-number gear to rotate only one circle, thus the rotation speed is reduced in two steps. Both the driven gears and the circle-number gear are provided with bearings, the bearings have magnets fixed therein, and the two magnets are relatively fixed with the driven gears and the circle-number gear, respectively. The top edges of the bearings fit with a printed circuit board (PCB). Angle sensing chips, which are fixed on the PCB, are above the magnets. The angle sensing chips are apart from the upper surfaces of the magnets by a fixed distance. When the magnets rotate, the magnetic field direction above the surfaces thereof also rotates. The angle sensing chips located above the magnets output an angle value indicating the change of the magnetic field direction when sensing the change of the magnetic field direction. This angle value is a value indicating the angle by which the magnets rotate. Meanwhile, the angle value indicates the angle by which the gears rotate. Such angle sensing chips may be of magneto-resistive angle sensing chips or Hall angle sensing chips. An absolute angle which stand for the rotation shaft rotating angle to be detected by following system calculation according to the rotation angles of the driven gears and the circle-number gear detected by the angle sensing chips. The cover plate is fixed on the housing, and the housing and the cover plate fix the position of the PCB by means of fitting. On one hand, as the PCB tightly compresses the gears, and on the other hand, as the housing supports the gears, the relative position between the driven gears, the circle-number gear and a transmission gear is effectively kept unchanged, which is conducive to improving the detection precision.

Preferably, the two-stage speed reduction device may comprise a middle transition gear and a circle-number gear, the middle transition gear comprises a large middle transition gear and a small middle transition gear, the large middle transition gear is externally meshed with the small driven gear, and the small middle transition gear is externally meshed with the circle-number gear.

Preferably, the two-stage speed reduction device may comprise a middle transition gear and a circle-number gear, the middle transition gear comprises a large middle transition gear and a small middle transition gear, the large middle transition gear is externally meshed with the small driven gear, and the small middle transition gear is externally meshed with the circle-number gear.

Preferably, the two-stage speed reduction device is a circle-number gear, and the small driven gear is internally meshed with the circle-number gear.

Preferably, bearing bushes are provided in the housing, and all the main gear, the driven gears, the middle transition gears and the circle-number gear are fixed inside the bearing bushes. A ribbed plate is arranged inside the housing, and a ribbed plate is also arranged on the cover plate. The cover plate is fixed on the housing, and the surface of the cover plate with the ribbed plate thereon faces the interior of the housing. Inside the housing, the PCB is clamped by both surfaces of the ribbed plate inside the housing and the ribbed plate on the cover plate, to ensure that the PCB fits with the top edges of the bearings on both the driven gears and the circle-number gear, so as to ensure that the angle sensing chips fixed on the PCB are apart from the upper surfaces of the magnets inside the bearings by a fixed distance.

Preferably, the main gear is further provided with a step structure which contacts the housing when the main gear and the housing of the detection device are assembled, to provide a certain height between the main gear and the housing, thereby preventing friction between the main gear and the housing during the rotation of the main gear.

Preferably, the magnetization direction of the magnets is radial, each magnet has only one pair of N/S magnetic poles, and the axial end of the magnets is of a boss structure. The structure prevents the axial motion and rotation movement of the magnets inside the driven gears and the circle-number gear, without affecting the distribution of internal magnetic lines, thus fixing the position.

Preferably, the angle sensing chips are apart from the upper surfaces of the magnets by a fixed distance between 0.2 mm and 3 mm. The magnetic field at the position is too strong if the fixed distance is too small, and the magnetic field at the position is too weak if the fixed distance is too large, in both cases, the angle sensing chips may be unable to work.

Preferably, the range of angles output by the angle sensing chips is between 0 degree and 360 degrees.

The invention further relates to a method for detecting an absolute multi-turn rotation angle, which comprises the following steps: constant values in the detection device are determined, wherein the teeth number of the main gear is Z1, the teeth number of the small driven gear is Z21, the teeth number of the large driven gear is Z22, the teeth number of the middle small gear is Z31, the teeth number of the middle large gear is Z32, and the teeth number of the circle-number gear is Z34; based on the above constant values, it is determined that the transmission ratio between the main gear and the driven gears is m=Z1/Z22, the transmission ratio between the driven gears and the middle gear is n=Z32/Z21*Z34/Z31, and the full range is A=(n/m)*2π; calibration is performed to designate the zero position, an angle Angle_Alpha0 and Circle_phi0 output by the angle sensing chips during calibration are read, and are stored and recorded; the rotation angles of the driven gears and the circle-number gear rotate are respectively detected by the angle sensing chips disposed on the driven gears and the circle-number gear, compensation is performed after original angle signals output by the corresponding chips are read, that is, the Angle_Alpha0 and Circle_phi0 which are stored and recorded during calibration are subtracted from the read original angle signals; rotation angle signals of Angle_Alpha and Circle_phi are output after compensation, respectively; the rotation circle number i of the driven gears 32 is calculated according to formula i=floor(Circle_phi/Circlestep), where, CircleStep=2π/n, and $i_{max}$=A/2π*(n−1); the rotation angle of the main gear is calculated according to formula θ=Angle_Alpha/m+i*2π/m based on the rotation angle signal Angle_Alpha output by the angle sensing chips and the rotation circle number i of the driven gears; and the angles from θ to range A are converted to an angle θ from −A/2 to +A/2 and then output.

Preferably, the method further comprises a step of checking the calculated main gear rotation angle, and the checking step mainly comprises: a tolerance range Δθ is given; the main gear rotation angle is calculated according to formula θ'=Circle_Phi*n/m based on the rotation angle signal Circle_phi output by the angle sensing chips on the circle-number gear, and the credibility of θ is checked by using θ'; and the absolute difference value Δi between θ and θ' is calculated according to formula Δi=abs(θ'−θ); it is determined whether Δ is smaller than the given tolerance range Δθ, if Δi is smaller than Δθ, the rotation angle θ is output, otherwise the rotation angle θ(i+1) corresponding to i+1 is calculated according to formula θ(i+1)=Angle_Alpha/m+(i+1)*2π/m; the absolute difference value Δ(i+1) between θ(i+1) and θ' is calculated according to formula Δ(i+1)=abs(θ'−θ(i+1)) to determine whether Δ(i+1) is smaller than the given tolerance range Δθ, if Δ(i+1) is smaller than Δθ, the rotation angle θ is output, otherwise the rotation angle θ(i−1) corresponding to i−1 is calculated according to formula θ(i−1)=Angle_Alpha/m+(i−1)*2π/m; the absolute difference valueΔ(i−1) between θ(i−1) and θ' is calculated according to formula Δ(i−1)=abs(θ'−θ(i−1)) to determine whether Δ(i−1) is smaller than the given tolerance range Δθ, and if Δ(i−1) is smaller than Δθ, the rotation angle θ is output, otherwise the system fails to output a correct rotation angle θ. The checking step has a fault-proofing capability. Outputting an angle is stopped when an error occurs at the sensing element or during the data processing, thereby improving the security of the whole system.

Compared with the prior art, the present invention has the advantages as follows.

(1) The present invention provides a device and method for detecting an absolute multi-turn rotation angle, with high precision and high resolution. By the device and method, the resolution of the detected rotation angle may reach 0.007 degrees. Further, the precision of the angle which is finally output merely depends on the precision of the driven gears. With the improvement of the resolution and precision, the nonlinearity of the device and the repeatability of zero when the device is powered on repetitively are enhanced greatly.

(2) In the device and method for detecting an absolute multi-turn rotation angle disclosed in the invention, it is unnecessary to store the value of the rotation angle in the case of power-off, and the current absolute rotation angle is still output when the device is powered on again, which is convenient for users' usage.

(3) The device and method for detecting an absolute multi-turn rotation angle disclosed in the invention are simple in algorithm and meanwhile have a fault-proofing capability, thus the stability is improved.

BRIEF DESCRIPTION OF THE DRAWINGS

The technical solutions of the present invention will be described in details as below in combination with the following drawings.

DETAILED DESCRIPTION OF THE INVENTION

Embodiment 1

Figure 1:
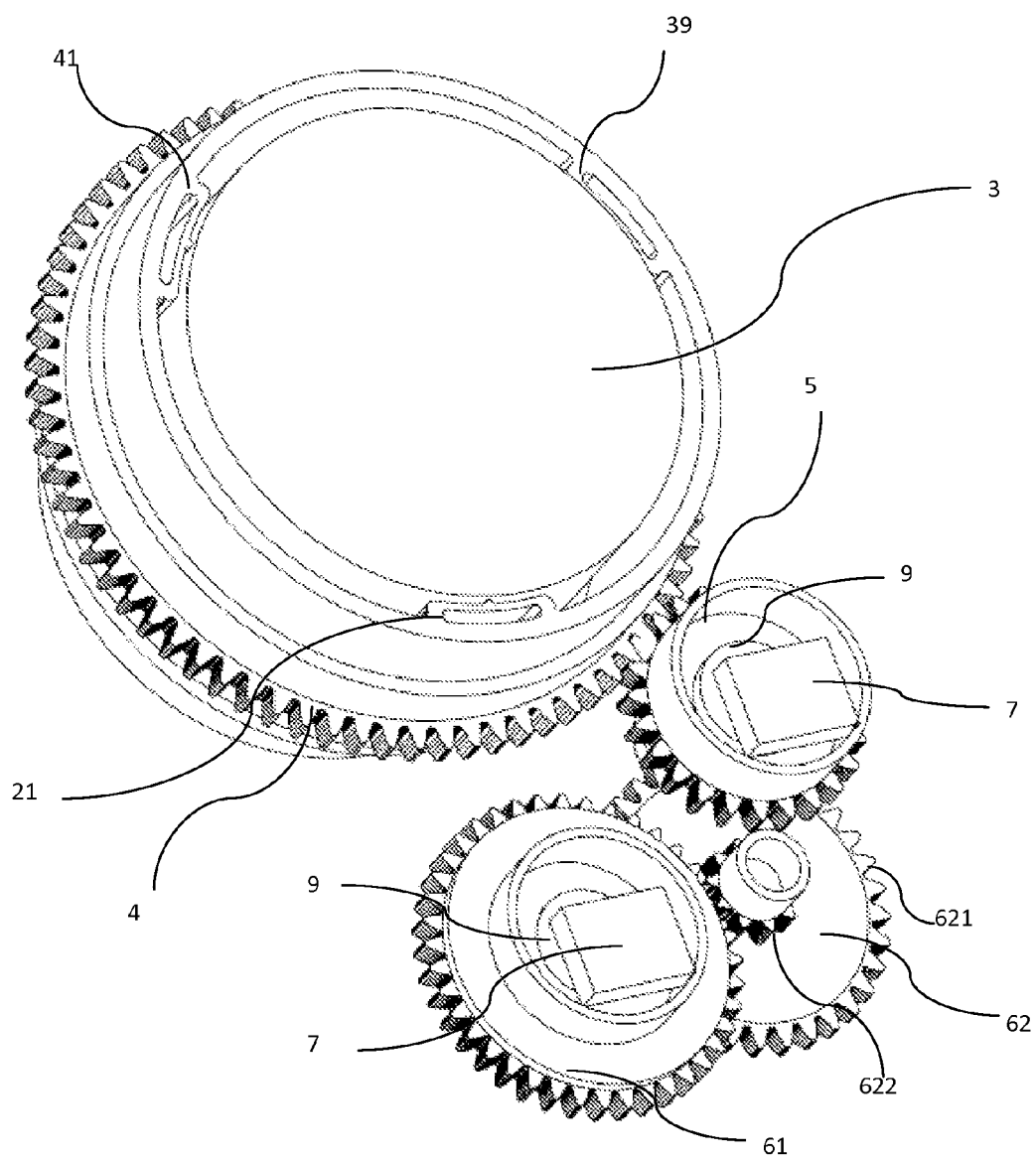
FIG. 1 is a front view structure diagram of a housing interior of embodiment 1 of the present invention.
Figure 2:
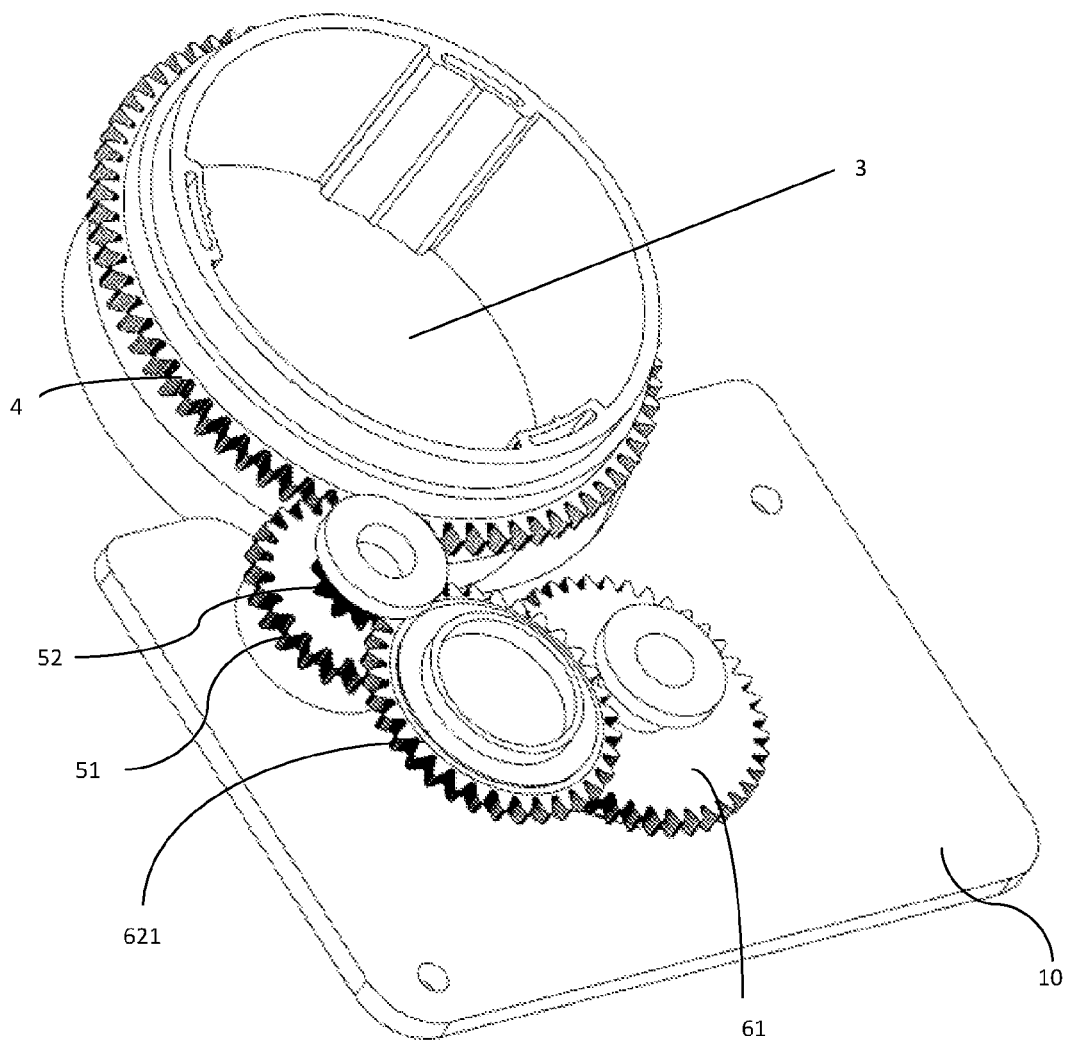
FIG. 2 is a rear view structure diagram of a housing interior of embodiment 1 of the present invention.
Figure 3:
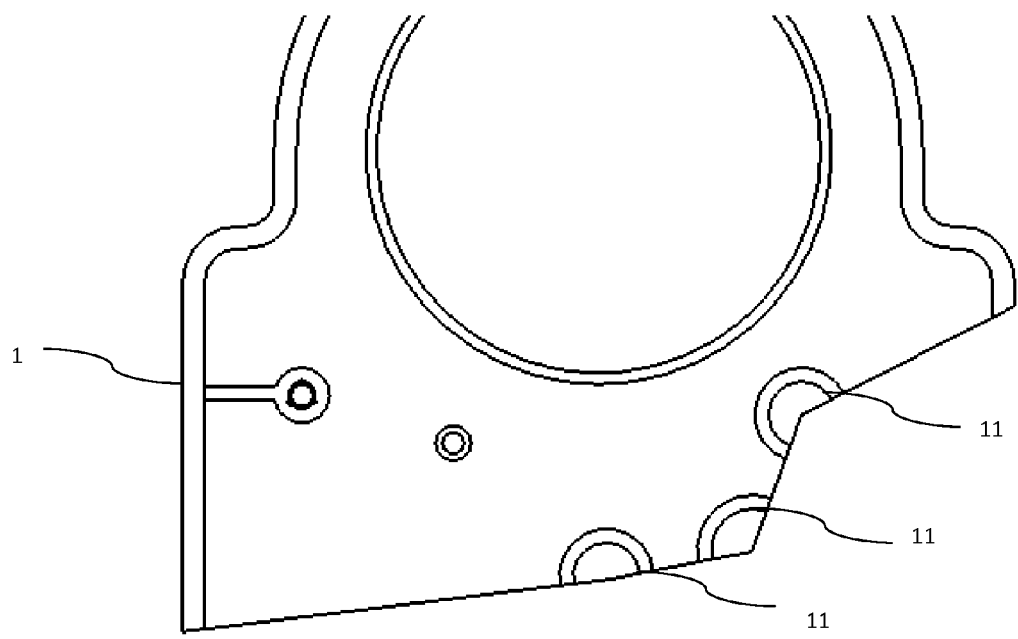
FIG. 3 is a structure diagram of a housing of embodiment 1 of the present invention.
Figure 4:
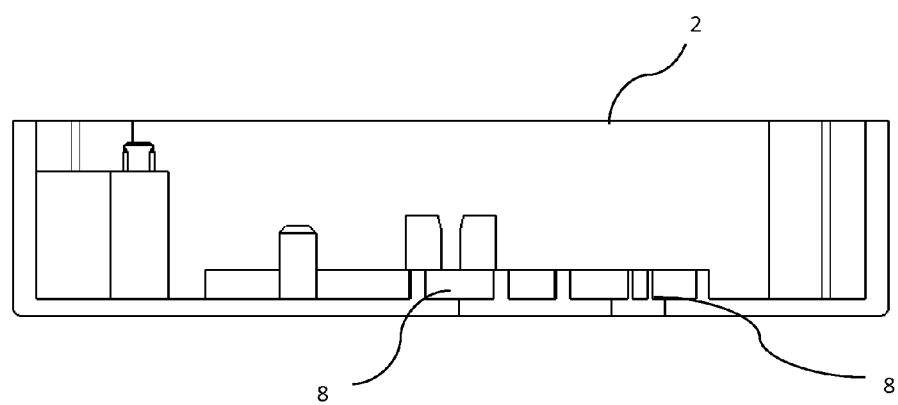
FIG. 4 is a schematic structure diagram of embodiment 1 of the present invention.

As shown in FIG. 1, FIG. 2, FIG. 3, and FIG. 4, the device for detecting an absolute multi-turn rotation angle disclosed in the present invention comprises a housing 1, a cover plate 2 (see FIG. 4), and a rotating shaft 3. The rotating shaft 3 is placed within the housing 1, the rotating shaft 3 is fixed with a main gear 4, and the main gear 4 is further provided with a step structure 41. The main gear 4 is meshed with driven gears 5 having a teeth number less than that of the main gear 4. The driven gears 5 comprise a large driven gear 51 and a small driven gear 52, and the main gear 4 is externally meshed with the large driven gear 51. The driven gears 5 are connected with a two-stage speed reduction device. The two-stage speed reduction device comprises a circle-number gear 61 and a middle transition gear 62. The middle transition gear 62 comprises a large middle transition gear 621 and a small middle transition gear 622, and the large middle transition gear 621 is externally meshed with the small driven gear 52. The teeth number of the small driven gear 52 is smaller than the teeth number of the large middle transition gear 621. The rotation speed is reduced in the first step. The small middle transition gear 622 is externally meshed with the circle-number gear 61. The teeth number of the small middle transition gear 622 is smaller than the teeth number of the circle-number gear 61. The rotation speed is reduced in the second step. The rotating shaft 3 rotates multiple circles to slow down to the circle-number gear 61, and the circle-number gear 61 rotates one circle only. Both the driven gears 5 and the circle-number gear 61 are provided with bearings 8 (see FIG. 4), and the bearings 8 have magnets 9 fixed therein. The magnetization direction of the magnets 9 is radial, each magnet has only one pair of N/S magnetic poles, and the axial end of the magnets 9 is of a boss structure. The two magnets 9 are relatively fixed with the driven gears 5 and the circle-number gear 61, respectively. Angle sensing chips 7, which are fixed on a PCB 10, are above the magnets 9. The range of angles output by the angle sensing chips 7 is between 0 degree and 360 degrees. The angle sensing chips 7 are apart from the upper surfaces of the magnets 9 by a fixed distance, and the fixed distance is between 0.2 mm and 3 mm. When the magnets 9 rotate, the magnetic field direction above the surfaces thereof also rotates. The angle sensing chips 7 located above the magnets 9 output an angle value indicating the change of the magnetic field direction when sensing the change of the magnetic field direction. This angle value is a value indicating the angle by which the magnets rotate. Meanwhile, the angle is the angle by which the driven gears 5 and the circle-number gear 61 rotate. Bearing bushes 11 are provided inside the housing 1 (see FIG. 3), and all the main gear 4, the driven gear 5, the middle transition gears 62, and the circle-number gear 61 are fixed inside the bearing bushes 11. A ribbed plate is arranged inside the housing 1, and a ribbed plate is also arranged on the cover plate 2. The cover plate 2 is fixed on the housing 1, and the surface of the cover plate 2 with the ribbed plate thereon faces the interior of the housing 1. Inside the housing 1, the PCB 10 is clamped by both surfaces of the ribbed plate inside the housing and the ribbed plate on the cover plate, to ensure that the PCB board 10 fits with the top edges of the bearings 61 on both the driven gears 5 and the circle-number gear 61, so as to ensure that the angle sensing chips 7 fixed on the PCB 10 are apart from the upper surfaces of the magnets 9 inside the bearings by a fixed distance.

Figure 5:
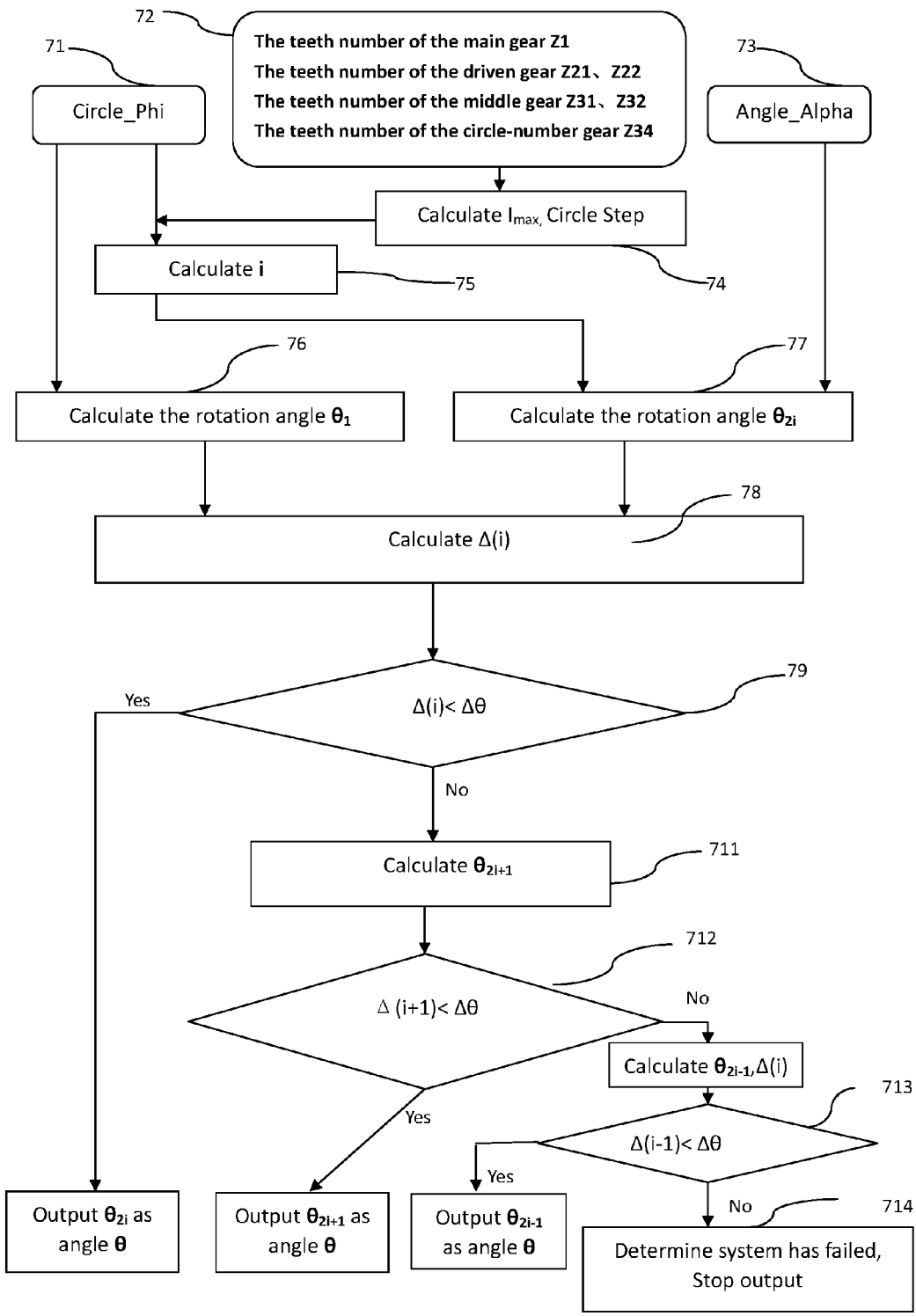
FIG. 5 is a schematic diagram of a method for calculating an absolute multi-turn rotation angle.
Figure 6:
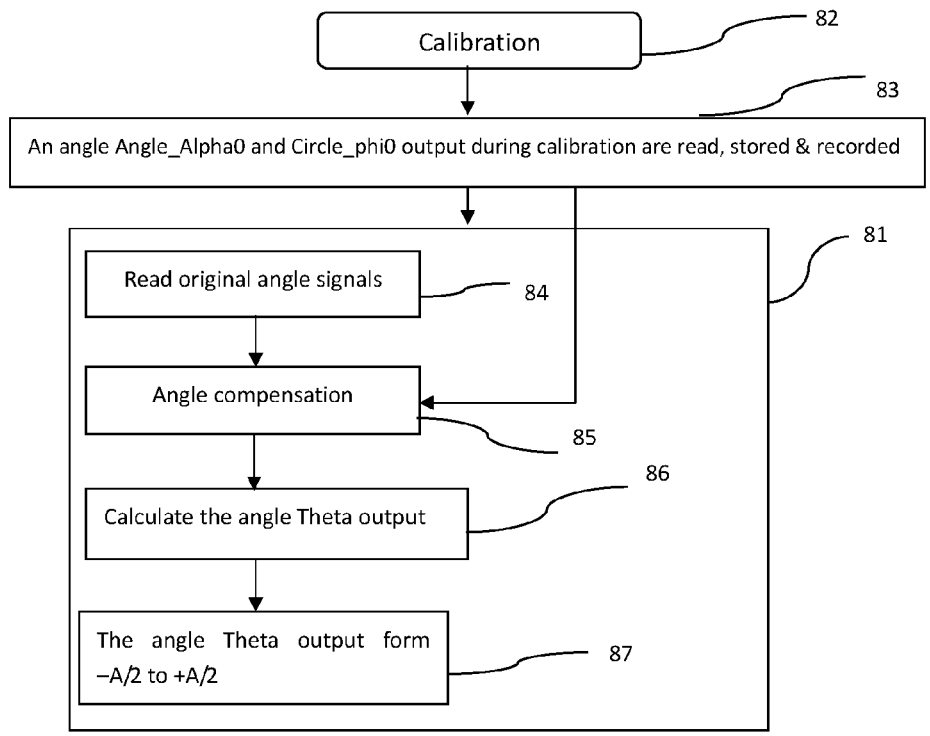
FIG. 6 is a principle schematic diagram of calibration of a rotation angle.

As shown in FIG. 5 and FIG. 6, the method for detecting an absolute multi-turn rotation angle disclosed in the present invention comprises the following steps:

(1) constant values in the detection device are determined, wherein the teeth number of the main gear is Z1, the teeth number of the small driven gear is Z21, the teeth number of the large driven gear is Z22, the teeth number of the middle small gear is Z31, the teeth number of the middle large gear is Z32, and the teeth number of the circle-number gear is Z34;

(2) based on the above constant values, the transmission ratio between the main gear and the driven gears is determined to be m=Z1/Z22, the transmission ratio between the driven gears and the middle gear is n=Z32/Z21*Z34/Z31, and the full range is A=(n/m)*2π;

(3) calibration is performed to designate the zero position, angles Angle_Alpha0 and Circle_phi0 output by the angle sensing chips during calibration are read, and are stored and recorded;

(4) the rotation angles of the driven gears and the circle-number gear are respectively detected by the angle sensing chips disposed on the driven gears and the circle-number gear, compensation is performed after the original angle signals output by the corresponding chips, that is, the Angle_Alpha0 and Circle_phi0 which are recorded during the storage and calibration are subtracted from the read original angle signals; rotation angle signals of Angle_Alpha and Circle_phi of the driven gear and the circle-number gear are respectively output after compensation, (5) the rotation circle number i of the driven gear 32 is calculated according to the formula i=floor(Circle_phi/Circlestep), where, CircleStep=2π/n;

(6) the main gear rotation angle is calculated according to formula θ=Angle_Alpha/m+i*2π/m based on the rotation angle signal Angle_Alpha output by the angle sensing chips and the driven gear rotation circle number i.

The credibility of θ is checked by using θ':

(1') a tolerance range Δθ is given, (2') the main gear rotation angle θ'=Circle_Phi*n/m is calculated according to the rotation angle signal Circle_phi output by the angle sensing chip on the circle-number gear;

(3') the absolute difference value Δi between θ and θ' is calculated according to formula Δi=abs(θ'−θ) to determine whether Δi is smaller than the given tolerance range Δθ; if Δi is smaller than Δθ, the rotation angle θ is output, otherwise the rotation angle θ(i+1) corresponding to i+1 is calculated according to formula θ(i+1)=Angle_Alpha/m+(i+1)*2π/m; the absolute difference value Δ(i+1) between θ(i+1) and θ' is calculated according to formula Δ(i+1)=abs(θ'−θ(i+1)) to determine whether Δ(i+1) is smaller than the given tolerance range Δθ, and if Δ(i+1) is smaller than Δθ, the rotation angle θ is output, otherwise the rotation angle θ(i−1) corresponding to i−1 is calculated according to formula $\theta(i-1)=\text{Angle\_Alpha}/m+(i-1)*2\pi/m$; the absolute difference value $\Delta(i-1)$ between $\theta(i-1)$ and $\theta'$ is calculated according to formula $\Delta(i-1)=\text{abs}(\theta'-\theta(i-1))$ to determine whether $\Delta(i-1)$ is smaller than the given tolerance range $\Delta\theta$, and if $\Delta(i-1)$ is smaller than $\Delta\theta$, the rotation angle $\theta$ is output, otherwise the system fails to output a correct rotation angle $\theta$.

Finally:

(7) The angles from $\theta$ to range A are converted to an angle $\theta$ from $-A/2$ to $+A/2$ and then output as the final output absolute angles.

Embodiment 2

Figure 7:
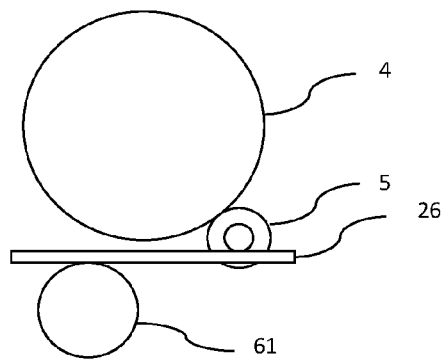
FIG. 7 is a schematic structure diagram of a housing interior of embodiment 2 of the present invention; and, FIG. 8 is a schematic structure diagram of a housing interior of embodiment 3 of the present invention.

As shown in FIG. 7, different from Embodiment 1, the two-stage speed reduction device 6 of the device for detecting an absolute multi-turn rotation angle disclosed in the present invention comprises a circle-number gear 61 and a gear rack 63. The gear rack 63 comprises bottom and top layers of gears, i.e., a large gear 631 and a small gear 632, respectively, wherein the large gear 631 is externally meshed with the small driven gear 52, the teeth number of the small driven gear 52 is smaller than the teeth number of the large gear 631, and the rotation speed is reduced in the first step. The small gear 632 is externally meshed with the circle-number gear 61, the teeth number of the small gear 632 is smaller than the teeth number of the circle-number gear 61, and the rotation speed is reduced in the second step. The rotating shaft rotates multiple circles to slow down to the circle-number gear 61, and the circle-number gear 61 rotates one circle only.

Embodiment 3

Figure 8:
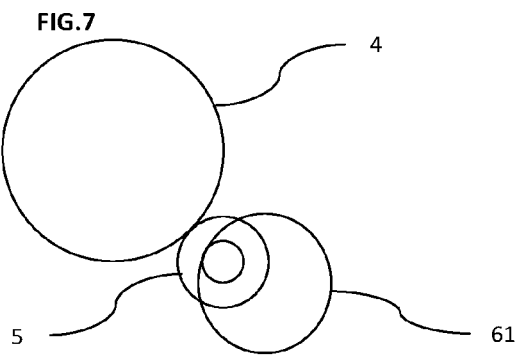

As shown in FIG. 8, different from Embodiment 1, the two-stage speed reduction device 6 of the device for detecting an absolute multi-turn rotation angle disclosed in the invention is a circle-number gear 61, and the small driven gear 52 is internally meshed with the circle-number gear 61. The teeth number of the small driven gear 52 is smaller than the teeth number of the circle-number gear 61. The rotating shaft rotates multiple circles to slow down to the circle-number gear 61, and the circle-number gear 61 rotates one circle only.

The invention claimed is:

1. A device for detecting an absolute multi-turn rotation angle, comprising a housing, a cover plate and a rotating shaft, the rotating shaft being placed within the housing, characterized in that the rotating shaft is fixed with a main gear, the main gear is meshed with driven gears having a teeth number smaller than that of the main gear, the driven gears comprise a large driven gear and a small driven gear that are coaxial, the main gear is externally meshed with the large driven gear, the driven gears are connected with a two-stage speed reduction device which enables the rotating shaft, rotating at one speed, to cause a circle-number gear to rotate at a second speed, lower than the first speed, such that the rotating shaft may rotate multiple circles while the circle-number gear rotates one circle only, both the driven gears and the circle-number gear are provided with bearings, each bearing has a magnet therein, and the two magnets are relatively fixed with the driven gears and the circle-number gear, respectively, the top edges of the bearings fit with a printed circuit board, angle sensing chips which are fixed on the printed circuit board are above the magnets, the angle sensing chips are apart from the upper surfaces of the magnets by a fixed distance, the cover plate is fixed on the housing, and the housing and the cover plate fix the position of the printed circuit board by means of fitting, wherein, in addition to the circle-number gear, the two-stage speed reduction device further comprises a large middle transition gear and a small middle transition gear that are coaxial, the large middle transition gear is externally meshed with the small driven gear, and the small middle transition gear is externally meshed with the circle-number gear.

2. The device for detecting an absolute multi-turn rotation angle according to claim 1, characterized in that bearing bushes are provided in the housing, all the main gear, the driven gears, the middle transition gears and the circle-number gear are fixed inside the bearing bushes, a ribbed plate is arranged inside the housing, a ribbed plate is also arranged on the cover plate, and the surface of the cover plate with the ribbed plate thereon faces the interior of the housing.

3. The device for detecting an absolute multi-turn rotation angle according to claim 2, wherein the main gear is further provided with a step structure;

wherein the magnetization direction of the magnets is radial, each magnet has only one pair of N/S magnetic poles, and the axial end of the magnets is of a boss structure;

wherein the angle sensing chips are apart from the upper surfaces of the magnets by a fixed distance between 0.2 mm and 3 mm; and wherein the range of angles output by the angle sensing chips is between 0 degree and 360 degrees.

4. The device for detecting an absolute multi-turn rotation angle according to claim 1, characterized in that the main gear is further provided with a step structure.

5. The device for detecting an absolute multi-turn rotation angle according to claim 1, characterized in that the magnetization direction of the magnets is radial, each magnet has only one pair of N/S magnetic poles, and the axial end of the magnets is of a boss structure.

6. The device for detecting an absolute multi-turn rotation angle according to claim 1, characterized in that the angle sensing chips are apart from the upper surfaces of the magnets by a fixed distance between 0.2 mm and 3 mm.

7. The device for detecting an absolute multi-turn rotation angle according to claim 1, characterized in that the range of angles output by the angle sensing chips is between 0 degree and 360 degrees.

8. A device for detecting an absolute multi-turn rotation angle, comprising a housing, a cover plate and a rotating shaft, the rotating shaft being placed within the housing, characterized in that the rotating shaft is fixed with a main gear, the main gear is meshed with driven gears having a teeth number smaller than that of the main gear, the driven gears comprise a large driven gear and a small driven gear that are coaxial, the main gear is externally meshed with the large driven gear, the driven gears are connected with a two-stage speed reduction device which enables the rotating shaft, rotating at one speed, to cause a circle-number gear to rotate at a second speed, lower than the first speed, such that the rotating shaft may rotate multiple circles while the circle-number gear rotates one circle only, both the driven gears and the circle-number gear are provided with bearings, each bearing has a magnet therein, and the two magnets are relatively fixed with the driven gears and the circle-number gear, respectively, the top edges of the bearings fit with a printed circuit board, angle sensing chips which are fixed on the printed circuit board are above the magnets, the angle sensing chips are apart from the upper surfaces of the magnets by a fixed distance, the cover plate is fixed on the housing, and the housing and the cover plate fix the position of the printed circuit board by means of fitting.

9. The device for detecting an absolute multi-turn rotation angle according to claim 8, characterized in that, in addition to the circular-number gear, the two-stage speed reduction device further comprises a gear rack, the gear rack comprises bottom and top layers of gears, which are a large gear and a small gear, respectively, wherein the large gear is externally meshed with the small driven gear, and the small gear is externally meshed with the circle-number gear.

10. The device for detecting an absolute multi-turn rotation angle according to claim 8, characterized in that the two-stage speed reduction device is the circle-number gear, and the small driven gear is internally meshed with the circle-number gear.

* * * * *